United States Patent
Sassatelli et al.

(10) Patent No.: US 8,624,147 B2
(45) Date of Patent: Jan. 7, 2014

(54) METHOD AND SYSTEM OF WELDING A BEARING

(75) Inventors: John Matthew Sassatelli, Valley Falls, NY (US); John Francis Nolan, Scotia, NY (US); Mark Edward Burnett, Barton, NY (US); Carter Cook, Westford, NY (US)

(73) Assignee: General Electric Company, Schenectady, NY (US)

( * ) Notice: Subject to any disclaimer, the term of this patent is extended or adjusted under 35 U.S.C. 154(b) by 986 days.

(21) Appl. No.: 11/738,252

(22) Filed: Apr. 20, 2007

(65) Prior Publication Data

US 2008/0257868 A1    Oct. 23, 2008

(51) Int. Cl.
*B23K 9/04*    (2006.01)

(52) U.S. Cl.
USPC ..................................... 219/76.14

(58) Field of Classification Search
USPC ........... 219/76.14, 121.11, 136, 137 R, 137.2
See application file for complete search history.

(56) References Cited

U.S. PATENT DOCUMENTS

| | | | |
|---|---|---|---|
| 3,578,831 A | 5/1971 | Scheifele | |
| 3,619,547 A | 11/1971 | Cavagnero | |
| 3,944,781 A * | 3/1976 | Urbanic et al. | 219/137 R |
| 4,654,501 A * | 3/1987 | Piatt | 219/76.14 |
| 5,197,720 A | 3/1993 | Renz et al. | |
| 6,013,890 A * | 1/2000 | Hulsizer | 219/76.14 |
| 6,137,076 A | 10/2000 | Esslinger et al. | |
| 6,271,495 B1 | 8/2001 | Rooney | |
| 6,274,839 B1 * | 8/2001 | Stone et al. | 219/76.12 |
| 6,284,995 B1 | 9/2001 | Esslinger et al. | |
| 6,448,531 B1 | 9/2002 | Esslinger et al. | |
| 6,653,589 B2 | 11/2003 | Dolton et al. | |
| 6,737,608 B2 | 5/2004 | Esslinger et al. | |
| 6,806,436 B2 | 10/2004 | Katou et al. | |
| 6,818,857 B1 | 11/2004 | Cho et al. | |

FOREIGN PATENT DOCUMENTS

| | | |
|---|---|---|
| JP | 54037047 A | 3/1979 |
| JP | 56158284 A | 12/1981 |
| JP | 57060771 U1 | 4/1982 |
| JP | 62-148087 A | 7/1987 |
| JP | 62148087 A | 7/1987 |
| JP | 62183967 A | 8/1987 |
| JP | H02274407 A | 11/1990 |
| JP | 07017340 U1 | 3/1995 |
| RU | 2198953 C2 | 2/2003 |

(Continued)

OTHER PUBLICATIONS

Kurkin et al., Technology, Mechanization and Automation of Production of Welded Structures, Atlas, Moscow, Mechanical Engineering, dated 1989, pp. 4.

RU Office Action, Application No. 2008115343, dated Apr. 23, 2012, pp. 4.

Decision to Grant issued in connection with RU Application No. 2008115343, Jul. 18, 2012.

(Continued)

*Primary Examiner* — Brian Jennison
(74) *Attorney, Agent, or Firm* — Armstrong Teasdale LLP

(57) ABSTRACT

A method of welding a bearing is provided. The method includes providing an apparatus including at least one welding torch and a processor, positioning a holding fixture proximate the apparatus, securing a bearing in position in the holding fixture, applying a bead of weld to facilitate repairing a damaged surface of the bearing and incrementally rotating the bearing with the apparatus.

15 Claims, 1 Drawing Sheet

(56) References Cited

FOREIGN PATENT DOCUMENTS

| RU | 2 254 968 C1 | 6/2005 |
| RU | 2266179 C2 | 12/2005 |
| RU | 2268121 C1 | 1/2006 |
| RU | 2 275 997 C2 | 5/2006 |
| RU | 2295423 C2 | 3/2007 |
| SU | 846158 A1 | 7/1981 |

OTHER PUBLICATIONS

JP Office Action dated Oct. 30, 2012 from corresponding Application No. 2008-105208 along with unofficial English translation.

Office Action dated Jul. 9, 2012 from the Japan Patent Office re Japanese Application No. 2008-105208 with unofficial English translation.

* cited by examiner

METHOD AND SYSTEM OF WELDING A BEARING

BACKGROUND OF THE INVENTION

This invention relates generally to automated welding, and more particularly, to methods and systems of welding a bearing.

Generally, manual repair of bearings is labor intensive because at least two operators are usually required to weld the upper and lower bearing half inner surfaces individually and separately. Moreover, known manual repair of bearings uses Gas Tungsten Arc Welding (GTAW) equipment which has a slow deposition rate.

To facilitate bearing repair with a faster deposition rate, at least some known bearings are repaired using gas metal arc welding GMAW. GMAW is an arc welding process in which a wire is continuously fed through a welding gun or torch. The wire functions as an electrode during welding. Generally, known GMAW systems include at least a control switch, a contact tip, a wire conduit that also functions as a liner, an exhaust hose and a torch. When the control switch is pressed by an operator, a wire feed mechanism forces the wire through the liner to the contact tip.

Known GMAW methods require proper guidance of the torch with respect to an area being welded. Orientation of the torch with respect to the surface being welded is also important for proper welding. For example, generally, for GMAW methods, the torch should be oriented vertically and at a substantially ninety degree angle to a surface being welded. When moving the torch while welding, the torch should generally remain vertical. As can be appreciated by one of ordinary skill in the art, depending on the component part being welded, it may be difficult to maintain a proper orientation of the torch during the welding operation. It should also be appreciated that when a bearing half having a U-shaped cross-section is stationary and the inner surface of the U-shape opening faces towards the torch, the torch cannot be maintained in a vertical orientation and at the same time provide flat position welding.

BRIEF DESCRIPTION OF THE INVENTION

In one aspect, a method of welding a bearing is provided. The method includes providing an apparatus including at least one welding torch and a processor, positioning a holding fixture proximate the apparatus, securing a bearing in position in the holding fixture, applying a bead of weld to facilitate repairing a damaged surface of the bearing and incrementally rotating the bearing with the apparatus.

In another aspect, a system of automated bearing repair is provided. The system includes an apparatus including a processor and torch. The system also includes a holding fixture positioned proximate the apparatus for securing a bearing position relative to the apparatus. The processor is configured to control the operation of the apparatus to enable a damaged surface of the bearing to be repaired by repeatedly applying a bead of weld to the surface such that all of the bearing surface is repaired.

In yet another aspect, an apparatus for welding a bearing is provided. The apparatus includes a plurality of devices, each device includes at least one welding torch and a processor. The apparatus also includes a plurality of holding fixtures, each holding fixture corresponds to one of the plurality of devices and includes a bearing. A damaged inner surface of each bearing is simultaneously repaired by applying a bead of weld to each bearing and incrementally rotating each bearing.

DETAILED DESCRIPTION OF THE INVENTION

Figure 1:
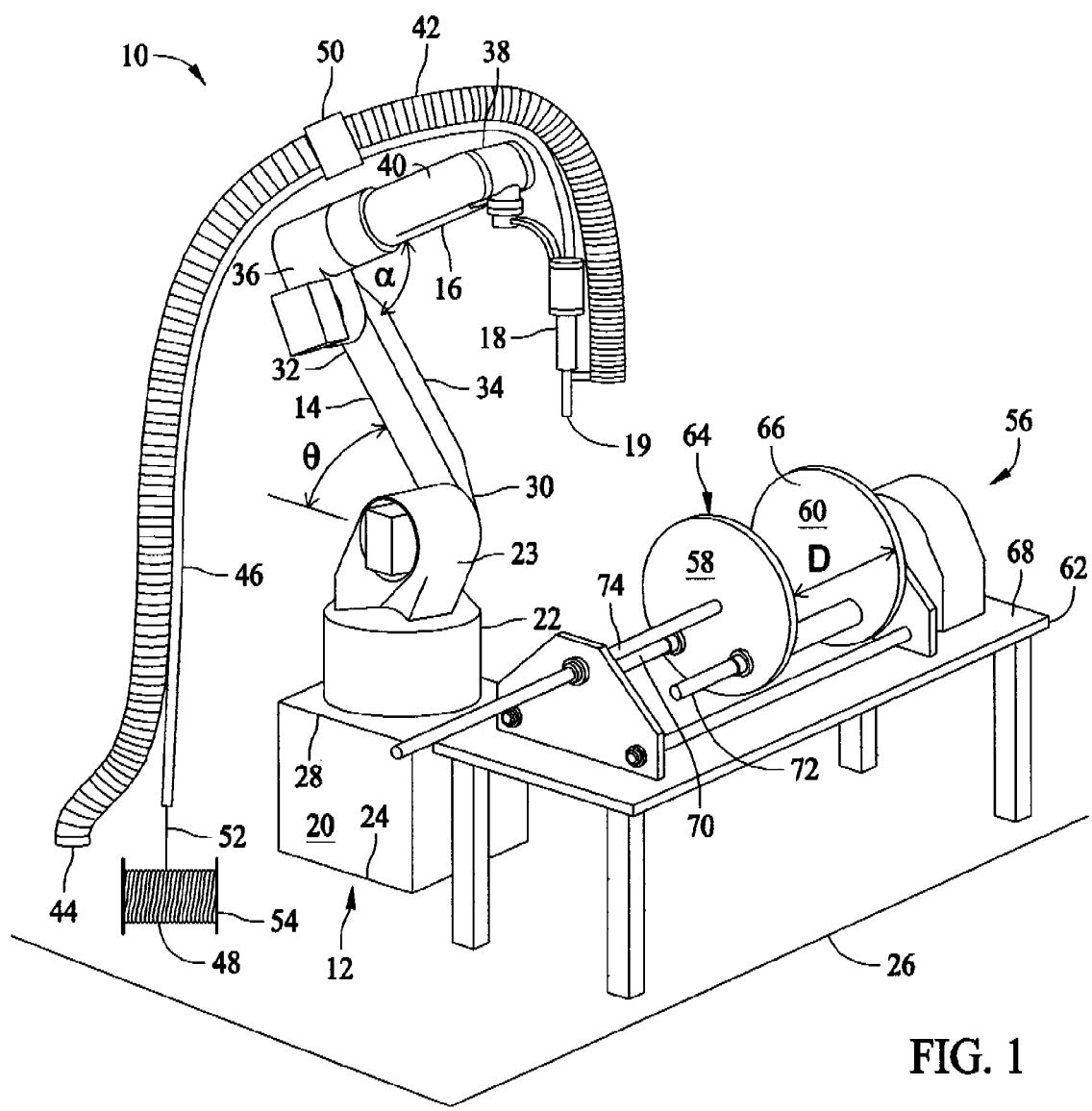
FIG. 1 is a perspective view of an exemplary apparatus that may be used to automatically repair bearings.

FIG. 1 is a perspective view of an exemplary apparatus 10 that may be used to repair bearings using an automated bearing welding process. More specifically, in the exemplary embodiment, apparatus 10 includes a base 12, a lower arm 14, an upper arm 16, a gas metal arc welding (GMAW) torch 18, a processor (not shown) and a memory (not shown). Base 12 includes a lower base portion 20 and an upper base portion 22. In the exemplary embodiment, lower base portion 20 has a rectangular cross-sectional configuration, a first end 24 secured against a floor 26, and a second end 28 that is positioned a distance above floor 26. Upper base portion 22 includes a joint 23 that rotatably couples lower arm 14 to base 12. In the exemplary embodiment, a motor (not shown), such as, but not limited to, a stepper/servo motor, may be positioned in either lower base portion 20 or upper base portion 22. It should be appreciated that although the exemplary embodiment is described as including a stepper/servo motor, in other embodiments, any device capable of imparting an accurate incremental rotation of only a few degrees and that facilitates welding as described herein, may be used. In the exemplary embodiment, base 12 is fabricated from a metallic material. In other embodiments, base 12 may be made from any material that enables apparatus 10 to function as described herein.

Lower arm 14 includes a first end 30, a second end 32, and a mid-section 34 that extends between ends 30 and 32. First end 30 is rotatably coupled to joint 23 and second end 32 is rotatably coupled to upper arm 16. Lower arm 14 may be rotated about first end 30 through any angle θ that enables apparatus 10 to function as described herein.

Upper arm 16 includes an upper first end 36, an upper second end 38 and an upper mid-section 40 that extends between ends 36 and 38. Upper first end 36 is rotatably coupled to second end 32 and upper second end 38 is coupled to GMAW torch 18. It should be understood that GMAW torch 18 may be coupled to upper second end 38 using any known means that enables apparatus 10 to function as described herein. Moreover, it should be understood that upper arm 16 may be rotated through any angle α that enables apparatus 10 to function as described herein. Apparatus 10 also includes an exhaust vent 42 that extends from torch 18 to an exhaust outlet 44.

Apparatus 10 includes a processor (not shown) including a memory (not shown). It should be understood that, as used herein, the term processor is not limited to just those integrated circuits referred to in the art as a processor, but broadly refers to a computer, a microcontroller, a microcomputer, a programmable logic controller, an application specific integrated circuit, and any other programmable circuit. It should be understood that the processor executes instructions stored in application memory. The above examples are exemplary only, and are thus not intended to limit in any way the definition and/or meaning of the term "processor". It should be appreciated that the processor enables apparatus 10 to manipulate through angles θ and α and to mathematically convert to a rectangular coordinate system in real space.

It should be appreciated that although the exemplary embodiment is described as including apparatus 10, in other embodiments, any other kind of device or apparatus may be used that enables welding bearings as described hereion.

The memory can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disk and disk drive, a writeable or re-writeable optical disk and disk drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and disk drive or the like.

In the exemplary embodiment, liner tube 46 extends from an electrode wire source 48 along exhaust vent 42 to torch 18. A feed mechanism 50 is coupled about liner tube 46. Wire source 48 includes an electrode wire 52 that is flat wound onto a spool 54 to facilitate feeding of wire 52. In the exemplary embodiment, wire 52 has a circular cross-sectional area and is fabricated from a babbit metal. In other embodiments, wire 52 may be fabricated from any material suitable for the lining of journal bearing sleeves, that facilitates automated welding as described herein. Such material includes, but is not limited to, white or soft metal. In the exemplary embodiment, liner tube 46 is a low friction nylon tube that functions as a conduit for passing wire 52 from wire source 48 to torch 18. It should be understood that liner tube 46 facilitates preventing kinking and binding of wire 52 en route to torch 18. In other embodiments, liner tube 46 may be fabricated from any material that facilitates preventing damaging wire 52 in any manner.

Any marks impressed on wire 52, or other damage to wire 52, may effect weld quality and cause jamming of wire 52 in liner tube 46 or in a contact tip 19 of torch 18. Thus, to ensure proper welding, the circular cross sectional area of wire 52 should not be distorted in any manner. Feed mechanism 50 includes a wire feed roller (not shown) and a tensioner (not shown) that facilitate forcing wire 52 through liner tube 46. In the exemplary embodiment, the wire feed roller and tensioner are specifically adjusted to facilitate passing wire 52 through liner tube 46 in such a manner that wire 52 maintains a circular cross sectional area en route to torch 18. Should the wire feed roller and tensioner be improperly adjusted, wire 52 may develop an elliptical cross-sectional area which may negatively effect electrical contact during welding.

A bearing holding fixture 56 includes, in the exemplary embodiment, a first plate 58, a second plate 60 that is substantially identical to first plate 58, and that is mounted on a support structure 62. First plate 58 includes a first inner surface 64 and second plate 60 includes a second inner surface 66. In the exemplary embodiment, plates 58 and 60 are substantially parallel to each other such that first inner surface 64 and second inner surface 66 are in a mirrored relationship and are separated by a distance D. Distance D is variably selected based on the bearing being repaired. Moreover, plates 58 and 60 translate independently of each other, but may be simultaneously translated in the same or opposite directions, or either plate 58 or 60 may be translated while the remaining plate 58 or 60 is not translated. More specifically, plates 58 and 60 are mounted on transition rods 70, 72 and 74 that are oriented substantially parallel to a surface 68 of support structure 62, to enable plates 58 and 60 to translate along a length of rods 70, 72 and 74. In the exemplary embodiment, plates 58 and 60 are substantially perpendicular to support structure surface 68.

Figure 2:
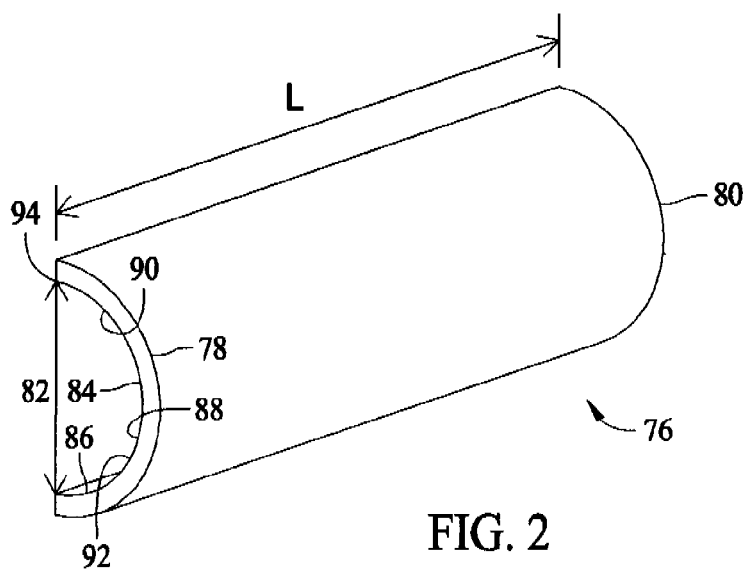
FIG. 2 is a perspective view of a portion of an exemplary bearing that was repaired using the apparatus shown in FIG. 1.

FIG. 2 is a perspective view of a portion of an exemplary bearing 76 to be repaired using apparatus 10. It should be understood that bearing 76 is one half of an entire bearing, and that two bearings 76 constitute an entire bearing. More specifically, bearing 76 has a substantially C-shaped cross-sectional profile and includes a first end 78 and a second end 80. Moreover, bearing 76 has a bore diameter 82 defined by a damaged inner surface 84, and a length L measured between ends 78 and 80. In the exemplary embodiment, bearing 76 is fabricated from a metallic material. In other embodiments, bearing 76 may be fabricated from any other material that facilitates automated welding as described herein.

It should be understood that in the exemplary embodiment, the processor of apparatus 10 is programmed based on the bearing 76 being repaired. Specifically, the processor is programmed based on bore diameter 82 and a length of a weld pass necessary by torch 18 to repair each bearing 76. After initially programming the processor, bearings 76 having the programmed bore diameter 82 and length L are repaired. When all bearings 76 having the programmed dimensions are repaired, the processor may be reprogrammed to repair differently-sized bearings 76. Doing so, increases repair productivity by taking advantage of the uniformity of bearings 76 being repaired. It should be understood that the length of each weld pass depends on the bearing length L of each bearing 76 being repaired. It should be understood that the processor is also programmed to incrementally rotate bearing 76 during welding.

Support structure 62 and bearing holding fixture 56 are positioned proximate apparatus 10 to facilitate torch 18 repairing inner surface 84. More specifically, when secured to fixture 56, bearing 76 inner surface 84 is oriented to face towards apparatus 10. More specifically, during operation, bearing 76 is positioned between plates 58 and 60 such that bearing first end 78 faces either first inner surface 64 or second inner surface 66, and such that second end 80 faces the other surface 64 or 66. Plates 58 and 60 are then translated on rods 70, 72, and 74 towards bearing 76, such that surfaces 64 and 66 are pressed against respective ends 78 or 80. More specifically, surfaces 64 and 66 are pressed against respective ends 78 or 80 with enough compressive force to facilitate securing bearing 76, lengthwise, between plates 58 and 60. Thus once bearing 76 is secured in position within fixture 56, the entire inner surface 84 of bearing 76 may be repaired using torch 18. It should be appreciated that when inner surface 84 is damaged, a white-metal/babbit finish of surface 84 is no longer smooth and is unsuitable for service. The damaged white-metal/babbit finish is removed and a new layer is applied as described below.

It should be appreciated that two bearing halves 76 of the same bearing may be worked simultaneously by abutting ends 78 and 80 to corresponding ends 78 and 80 of a complementary bearing half 76. A bead of weld is then applied during a pass of length 2 L. It should be understood that a copper or other non-consumable insert is positioned between bearing halves 76 to prevent welding both bearing halves 76 together. Thus, bearings halves 76 can be separated.

In the exemplary embodiment, apparatus 10 initially positions torch 18 intermediate bearing first end 78 and second end 80, and proximate a bottom edge 86 of bearing 76. After initially positioning torch 18, torch 18 is guided back and forth such that torch 18 may weld inner surface 84 along bearing length L. While torch 18 is guided back and forth during welding, apparatus 10 also maintains torch 18 in a proper orientation with respect to inner surface 84. More specifically, torch 18 is maintained substantially perpendicular to inner surface 84 during welding. It should be understood that after torch 18 applies a bead of weld along a line of length L, bearing holding fixture 56 incrementally rotates bearing 76 to enable torch 18 to weld along a line of length L immediately adjacent to the previous weld applied to bearing inner surface 84. Rotating bearing 76 also facilitates maintaining torch 18 substantially perpendicular to inner surface 84. Consequently, as fixture 56 incrementally rotates bearing 76, torch 18 repeatedly applies a weld back and forth across inner surface 84. Thus, the entire inner surface 84 of bearing 76 is facilitated to be repaired.

It should be appreciated that although the exemplary embodiment is described as welding immediately adjacent the previous weld, in other embodiments, bearing 76 may be rotated at any angle prior to applying a subsequent bead of weld such that the subsequent bead of weld is not immediately adjacent to the previous weld. Furthermore, it should be appreciated that torch 18 may be initially positioned at any point on inner surface 84 to start welding.

For example, to prevent local over heating and subsequent remelting of deposited material, welding may start at point 88 of inner surface 84. After applying a bead of weld along a line of length L starting at point 88, bearing 76 may be rotated such that a bead of weld is applied starting at point 90. Subsequently, bearing 76 may be rotated such that a bead of weld is applied starting at point 92. Then a bead of weld may be applied starting at point 94. After applying these beads of weld, a bead of weld is applied immediately adjacent and to the left of each weld. That is, a bead of weld is first applied immediately adjacent and to the left of the weld started at point 88. Then a bead of weld is applied immediately adjacent and to the left of the weld started at point 90. This process is repeated for applying a bead of weld adjacent to the welds started at points 92 and 94. This process is repeated until the entire inner surface 84 is facilitated to be repaired.

It should be appreciated that although the exemplary embodiment is described as axially rotating bearing 76 and applying beads of weld axially to inner surface 84, in other embodiments, bearing 76 may be rotated axially while beads of weld are applied circumferentially to facilitate repairing inner surface 84. It should be understood that the welding process described in the exemplary embodiment may be used for welding or repairing articles or bearings having at least one axis of symmetry, including spherical articles or bearings. Repairing spherical articles or bearings using the welding process described in the exemplary embodiment, requires varying the rotational speed of the bearing or article depending on the bearing or article diameter perpendicular to the axis of symmetry.

In each embodiment, the above-described robotic manipulator facilitates using a GMAW torch to weld bearings of many sizes. Moreover, because welding is performed in a flat position, the deposition rate is facilitated to be increased as compared to GTAW processes. It should be appreciated that although GMAW is faster than GTAW as a process, the vertical orientation of torch 18 stabilizes the molten pool of material. More specifically, automated processing enables only one operator to operate several such devices to repair several bearings simultaneously. As a result, the apparatus and methods described herein, facilitate reducing costs and improving throughput, and reducing waste by continuously feeding wire, as compared to GTAW processes wherein the end (stub) of each piece of filler metal must be discarded. Accordingly, welding performance and component useful life are each facilitated to be enhanced in a cost effective and reliable manner while maintenance costs are facilitated to be reduced.

Exemplary embodiments for methods of automated bearing welding are described above in detail. The methods are not limited to use with the specific method described herein, but rather, the methods can be utilized independently and separately from other methods described herein. Moreover, the invention is not limited to the embodiment of the method for automated bearing welding described above in detail. Rather, other variations of automated bearing welding may be utilized within the spirit and scope of the claims.

While the invention has been described in terms of various specific embodiments, those skilled in the art will recognize that the invention can be practiced with modification within the spirit and scope of the claims.

What is claimed is:

1. A method of welding a bearing having two opposed ends, said method comprising:
   providing an apparatus including at least one welding torch and a processor;
   coupling the at least one welding torch to an arm that is selectably moveable to enable the at least one welding torch to move at least two of vertically, horizontally, and pivotably relative to the bearing;
   positioning a holding fixture proximate the apparatus, wherein the holding fixture includes a pair of plates, wherein at least one of the plates is horizontally movable;
   securing the bearing in position in the holding fixture such that an inner surface of the bearing is exposed towards the at least one welding torch, by pressing the bearing at the two opposed ends with the pair of plates such that the bearing is retained in position between the pair of plates;
   orienting, using the arm, the at least one welding torch to be substantially perpendicular to the exposed inner surface;
   applying a bead of weld to the inner surface of the bearing to facilitate repairing a damaged surface of the exposed inner surface of the bearing;
   incrementally rotating at least one of the pair of plates during at least one of application of the bead of weld and a period of time after application of the bead of weld; and
   maintaining the torch substantially perpendicular to the exposed inner surface during the welding process.

2. A method in accordance with claim 1 wherein applying a bead of weld to the bearing further comprises guiding the torch, axially or circumferentially, back and forth across the exposed bearing inner surface using the apparatus.

3. A method in accordance with claim 1 wherein providing an apparatus further comprises coupling a feed mechanism to the apparatus for feeding a wire electrode from a wire source to the torch.

4. A method in accordance with claim 3 wherein providing a feed mechanism further comprises feeding the wire electrode through a tube fabricated from a low-friction nylon material.

5. A method in accordance with claim 3 wherein providing a feed mechanism further comprises adjusting the feed mechanism to facilitate forcing the wire electrode through a tube without altering the cross-sectional shape of the wire electrode.

6. A method in accordance with claim 1 wherein providing an apparatus further comprises feeding a wire electrode to the torch, wherein the wire electrode is fabricated from a babbit metal and has a substantially circular cross-section.

7. A system of automated bearing repair for a bearing having two opposed ends, said system comprising:

an apparatus comprising a processor and a gas metal arc welding torch coupled to an arm that is selectably moveable to enable the welding torch to move at least two of vertically, horizontally, and pivotably relative to the bearing; and a holding fixture positioned proximate said apparatus for securing an inner surface of a bearing substantially towards said apparatus in a position exposing said inner surface to said torch, said holding fixture comprising a pair of plates, wherein at least one of said plates is horizontally movable, to enable the bearing to be retained at the opposed ends between said pair of plates, said apparatus configured to orient, using said arm, said gas metal arc welding torch to be substantially perpendicular to the exposed bearing inner surface, said processor is configured to control the operation of said apparatus to enable a damaged surface of the bearing to be repaired by repeatedly applying a bead of weld from said torch to the exposed bearing inner surface such that all of the bearing inner surface is repaired, wherein at least one of said plates configured for rotation during at least one of application of the bead of weld and a period of time after application of the bead of weld, said apparatus configured to maintain said gas metal arc welding torch substantially perpendicular to the bearing inner surface while a bead of weld is applied to the bearing inner surface.

8. A system in accordance with claim 7 wherein said apparatus is further configured to:

instruct a robot to guide said gas metal arc welding torch back and forth across the bearing inner surface according to parameters of the bearing; and incrementally rotate the bearing.

9. A system in accordance with claim 7 wherein said processor is configured to continuously feed a wire electrode to said gas metal arc welding torch.

10. A system in accordance with claim 9 wherein said wire electrode has a substantially circular cross-section and is fabricated from babbit metal.

11. A system in accordance with claim 7 wherein said processor is configured to feed a wire electrode through a low friction nylon tube without altering a cross-sectional shape of said wire electrode.

12. An apparatus for welding a bearing having two opposed ends, said apparatus comprising:

at least one device comprising at least one welding torch and a processor, said at least one welding torch coupled to an arm that is selectably moveable to enable the at least one welding torch to move at least two of vertically, horizontally, and pivotably relative to the bearing; and a plurality of holding fixtures, each holding fixture corresponding to each of said at least one device and positioned proximate to said apparatus for securing a position of an exposed inner surface of a bearing substantially towards said at least one welding torch, each holding fixture comprising a pair of plates, wherein at least one of said plates is horizontally movable, to enable the bearing to be secured at the opposed ends between said pair of plates, said at least one welding torch oriented, using said arm, to be substantially perpendicular to the exposed bearing inner surface, wherein a damaged inner surface of each bearing is simultaneously repaired by applying a bead of weld by said at least one welding torch to the exposed bearing inner surface and incrementally rotating each bearing while said at least one torch is maintained substantially perpendicular to the bearing inner surface, wherein at least one of said plates configured for rotation during at least one of application of the bead of weld and a period of time after application of the bead of weld.

13. An apparatus in accordance with claim 12 wherein said at least one device comprises a feeding mechanism for forcing a wire electrode through a tube fabricated from a non-friction nylon material.

14. An apparatus in accordance with claim 13 wherein said wire electrode has a substantially circular cross-section and is fabricated from a babbit metal.

15. An apparatus in accordance with claim 12 wherein the exposed inner surface of each bearing is positioned towards said at least one device.

* * * * *